(12) United States Patent
Berezin et al.

(10) Patent No.: US 10,577,895 B2
(45) Date of Patent: Mar. 3, 2020

(54) ENERGY DEPOSIT DISCOVERY SYSTEM AND METHOD

(71) Applicants: Alan Bruce Berezin, Austin, TX (US); Justin Reed Birmingham, Austin, TX (US); Mark Robinson, Austin, TX (US); Samuel V. Scarpino, Austin, TX (US); Jason Wayne Simmons, Austin, TX (US); Christopher Smith, Austin, TX (US)

(72) Inventors: Alan Bruce Berezin, Austin, TX (US); Justin Reed Birmingham, Austin, TX (US); Mark Robinson, Austin, TX (US); Samuel V. Scarpino, Austin, TX (US); Jason Wayne Simmons, Austin, TX (US); Christopher Smith, Austin, TX (US)

(73) Assignee: Drilling Info, Inc., Austin, TX (US)

( * ) Notice: Subject to any disclaimer, the term of this patent is extended or adjusted under 35 U.S.C. 154(b) by 0 days.

(21) Appl. No.: 13/682,577

(22) Filed: Nov. 20, 2012

(65) Prior Publication Data
US 2014/0142906 A1 May 22, 2014

(51) Int. Cl.
*E21B 43/00* (2006.01)
(52) U.S. Cl.
CPC .................. *E21B 43/00* (2013.01)
(58) Field of Classification Search
None
See application file for complete search history.

(56) References Cited

U.S. PATENT DOCUMENTS

| | | |
|---|---|---|
| 4,633,400 A | 12/1986 | Chittineni |
| 5,003,813 A | 4/1991 | Hayes |
| 5,056,066 A | 10/1991 | Howard |
| 5,835,882 A | 11/1998 | Vienot et al. |
| 5,987,388 A | 11/1999 | Crawford |
| 6,223,126 B1 | 4/2001 | Neff et al. |
| 6,295,504 B1 | 9/2001 | Ye et al. |
| 6,965,383 B2 | 11/2005 | Ritter |
| 7,054,753 B1 | 5/2006 | Williams et al. |
| 7,069,149 B2 | 6/2006 | Goff |
| 7,516,055 B2 | 4/2009 | Strebelle et al. |
| 7,525,349 B2 | 4/2009 | Mavoori et al. |
| 8,265,876 B1 | 9/2012 | Yu et al. |
| 8,826,879 B2 | 9/2014 | Lee |
| 9,182,511 B2 | 11/2015 | Neave |

(Continued)

FOREIGN PATENT DOCUMENTS

| | | |
|---|---|---|
| WO | WO 2010/110824 | 9/2010 |
| WO | WO 2011/100009 | 8/2011 |

OTHER PUBLICATIONS

Watson, A. Ted, et al. NMR characterizations of properties of heterogeneous media. Research Report, Final Report. US Department of Energy, DOE Award No. DE-AC26-99BC15202, Texas A&M University, 2005., pp. 1-151.*

(Continued)

*Primary Examiner* — Bijan Mapar
(74) *Attorney, Agent, or Firm* — DLA Piper LLP (US)

(57) ABSTRACT

An energy deposit determining system and method are provided that determines a productive lease or well. The system and method may be used for oil wells, gas wells, oil and gas explorations and/or mineral leases.

24 Claims, 10 Drawing Sheets

(56) References Cited

U.S. PATENT DOCUMENTS

| | | | |
|---|---|---|---|
| 9,418,339 | B1 | 8/2016 | Leonard |
| 9,618,639 | B2 | 4/2017 | Witte et al. |
| 2004/0015296 | A1 | 1/2004 | Causse et al. |
| 2004/0220790 | A1 | 11/2004 | Cullick et al. |
| 2004/0260476 | A1 | 12/2004 | Borgos et al. |
| 2006/0052937 | A1 | 3/2006 | Zoraster et al. |
| 2006/0075007 | A1 | 4/2006 | Anderson et al. |
| 2006/0193205 | A1 | 8/2006 | Herkenhoff |
| 2006/0274386 | A1 | 12/2006 | Wakazono et al. |
| 2007/0276604 | A1 | 11/2007 | Williams |
| 2008/0033935 | A1 | 2/2008 | Frank |
| 2009/0043507 | A1 | 2/2009 | Dommisse et al. |
| 2009/0125288 | A1 | 5/2009 | Main et al. |
| 2009/0141028 | A1 | 6/2009 | Arora |
| 2009/0144032 | A1 | 6/2009 | Arora |
| 2009/0157319 | A1 | 6/2009 | Mitchell |
| 2009/0319243 | A1 | 12/2009 | Suarez-rivera et al. |
| 2010/0125349 | A1* | 5/2010 | Abasov et al. ............... 700/90 |
| 2010/0214870 | A1 | 8/2010 | Pepper et al. |
| 2011/0002194 | A1 | 1/2011 | Imhof et al. |
| 2011/0011595 | A1* | 1/2011 | Huang et al. ............... 166/369 |
| 2011/0042098 | A1 | 2/2011 | Imhof |
| 2011/0115787 | A1 | 5/2011 | Kadlec |
| 2011/0122136 | A1 | 5/2011 | Jo |
| 2011/0172976 | A1 | 7/2011 | Budiman et al. |
| 2011/0181610 | A1 | 7/2011 | Baggs et al. |
| 2011/0213577 | A1 | 9/2011 | Mousavi et al. |
| 2011/0313743 | A1 | 12/2011 | Oury et al. |
| 2012/0010865 | A1 | 1/2012 | Benson |
| 2012/0080197 | A1 | 4/2012 | Dickens et al. |
| 2012/0253770 | A1 | 10/2012 | Stern et al. |
| 2013/0090855 | A1 | 4/2013 | Rasmus et al. |
| 2013/0169644 | A1 | 7/2013 | Bolton et al. |
| 2013/0229891 | A1 | 9/2013 | Witte et al. |
| 2013/0262052 | A1 | 10/2013 | Mallet et al. |
| 2013/0332131 | A1 | 12/2013 | Russel |
| 2014/0140580 | A1 | 5/2014 | Neave |
| 2014/0222347 | A1 | 8/2014 | Bashore |
| 2014/0254884 | A1 | 9/2014 | Elkington et al. |
| 2014/0262246 | A1 | 9/2014 | Li et al. |
| 2014/0316706 | A1 | 10/2014 | Grant et al. |
| 2015/0098627 | A1 | 4/2015 | Ye |
| 2015/0198029 | A1 | 7/2015 | Chen |
| 2016/0139282 | A1 | 5/2016 | Dimitrov |
| 2016/0237810 | A1 | 8/2016 | Beaman, Jr. et al. |
| 2017/0108614 | A1 | 4/2017 | Neave et al. |
| 2018/0253873 | A1 | 9/2018 | White et al. |

OTHER PUBLICATIONS

Hintze, J.L. (2007), NCSS Data Analysis User's Guide III, Regression and Curve Fitting. NCSS 2007. Retrieved from http://ncss.wpengine.netdna-cdn.com/wp-content/uploads/2012/09/NCSSUG3.pdf, pp. 1-653.*

Watson, A. Ted, et al. NMR characterizations of properties of heterogeneous media. Research Report, Final Report. US Department of Energy, DOE Award No. DE-AC26-99BC15202, Texas A&M University, 2005.*

Vander Valk, P. A., and P. Yang. "Investigation of key parameters in SAGD wellbore design and operation." Journal of Canadian Petroleum Technology 46.6 (2007): 49-56.*

Hintze, J.L. (2007), NCSS Data Analysis User's Guide III, Regression and Curve Fitting. NCSS 2007. Retrieved from http://ncss.wpengine.netdna-cdn.com/wp-content/uploads/2012/09/NCSSUG3.pdf.*

Can, Bunyamin. Probabilistic performance forecasting for unconventional reservoirs with stretched-exponential model. Diss. Texas A&M University, 2011.*

Ouenes, Ahmed, et al. "Practical use of neural networks in tight gas fractured reservoirs: application to the San Juan Basin." paper SPE 39965 (1998).*

Wikipedia. Wikipedia, Overfitting. Revision from Aug. 23, 2012. pp. 1-3. Retrieved from http://en.wikipedia.org/w/index.php?title=Overfitting&oldid=508784472.*

PCT International Search Report of PCT/US13/68349; dated Jan. 30, 2014; (3 pgs.).

PCT Written Opinion of the International Searching Authority of PCT/US13/68349; dated Jan. 30, 2014; (5 pgs.).

PCT International Search Report of PCT/US13/70838; dated Apr. 9, 2014; (3 pgs.).

PCT Written Opinion of the International Searching Authority of PCT/US13/70838; dated Apr. 9, 2014; (5 pgs.).

PCT International Search Report of PCT/US13/68348; dated Apr. 29, 2014; (3 pgs.).

PCT Written Opinion of the International Searching Authority of PCT/US13/68348; dated Apr. 29, 2014; (5 pgs.).

PCT International Search Report of PCT/US14/34546; dated Sep. 22, 2014; (3 pgs.).

PCT Written Opinion of the International Searching Authority of PCT/US14/34546; dated Sep. 22, 2014; (58 pgs.).

E. W. Dijkstra; "A Note on Two Problems in Connexion with Graphs" dated Jun. 11, 1959; pp. 269-271; (3 pgs.).

Coleou, et al.; "Unsupervised Seismic Facies Classification: A Review and Comparison of Techniques and Implementation" dated Oct. 2003; pp. 942-953; (7 pgs.).

Andersen, et al.; "Seismic Waveform Classification: Techniques and Benefits," Dated Mar. 2004; pp. 26-29; (4 pgs.).

Castro de Matos, et al. "Unsupervised Seismic Facies Analysis Using Wavelet Transform and Self-Organizing Maps" dated Dec. 13, 2006; vol. 72, No. 1, pp. P9-P21, 19 Figs.; (13 pgs.).

Jeong, et al.; "A Fast Iterative Method for Eikonal Equations" dated Jul. 23, 2008; vol. 30, No. 5, pp. 2512-2534; (23 pgs.).

Roy, et al.; "Automatic Seismic Facies Classification with Kohonen Self Organizing Maps—a Tutorial" dated Dec. 2010; pp. 6-14; (9 pgs.).

Hollt, et al.; "Interactive Seismic Interpretation with Piecewise Global Energy Minimization" dated Mar. 1, 2011; pp. 59-66; (8 pgs.).

Diersen et al.; "Classification of Seismic Windows Using Artificial Neural Networks" dated 2011; pp. 1-10; (10 pgs.).

PCT International Preliminary Report on Patentability of PCT/US13/34546; dated Oct. 7, 2014; (12 pgs.).

PCT International Preliminary Report on Patentability of PCT/US13/68348; dated May 5, 2015; (5 pgs.).

PCT International Preliminary Report on Patentability of PCT/US13/70838; dated May 26, 2015; (6 pgs.).

Admasu et al., Automatic Method for Correlating Horizons Across Faults in 3d Seismic Data, Computer Vision and Pattern Recognition, 2004, CVPR 2004, Proceedings of the 2004 IEEE Computer Society Conference, vol. 1 (6 pgs.).

Aurnhammer et al., *A Genetic Algorithm for Automated Horizon Correlation Across Faults in Seismic Images*, IEEE Transactions on Evolutionary Computation, vol. 9., No. 2, Apr. 2005 (10 pgs.).

Brown et al., *Seismic Event Tracking by Global Path Optimization*, 76th Annual International Meeting, SEG, Expanded Abstracts, 1063-1067, 2006 (4 pgs).

Forth et al., *Application of Statistical Analysis to Optimize Reservoir Performance*, Journal of Canadian Petroleum Technology, Sep. 1, 1997 (7 pgs.).

Goshtasby 'Image Registration Principle, Tools and Methods, 2012, XVIII, pp. 7-66 (2012).

Herrera, *Automated Seismic-to-well Ties?*, 7th EAGE Conference & Exhibition incorporating SPE EUROPEC 2012, Jun. 1, 2012 (5 pgs.).

Kass et al., Snakes: Active Contour Models, International Journal of Computer Vision, 321-331, 1988 (11 pgs).

Morita et al. Extracting time-ordered pairs of similar subsequences by time warping approach, 3rd International Workshop on Mining Temporal and Sequential Data, Aug. 22, 2004 (12 Pages).

Mortensen et al., Interactive Segmentation with Intelligent Scissors, Graphical Models and Image Processing, 60(5):349-384 (1998) (48 pgs).

Pages from Website: http://www.neuralog.com/pages/NeuraLog.html, printed Dec. 3, 2015 (2 pgs).

(56) References Cited

OTHER PUBLICATIONS

Welch et al. Free Form Shape Design Using Triangulated Surfaces, Computer Graphics, 28, Proc. SIGGRAPH '94, 1994 (preprint) (10 pgs).

Yang, *Integrated Reservoir Description from Seismic, Well Log, to Production Data*, SPE 38381 © May 18, 1997 (9 pgs.).

Zoraster et al., *Curve Alignment for Well-to-Well Log Correlation*, SPE 90471, SPE Annual Technical Conference and Exhibition, Dec. 31, 2004 (6 pgs.).

Lineman et al.: Well-to-Well Log Correlation Using Knowledge-Based Systems and Dynamic Depth Warping, dated Jan. 1, 1987 (Jan. 1, 1987); XP055327735, Retrieved From the Internet URL:. https://dspace.mit.edu/bitstream/handle/1721.1/75091/1987. 14Lineman et al.Pdf?sequence=1 [retrieved on Dec. 9, 2016] (34 pgs.).

European Patent Application No. 13856215.2—Office Action dated Nov. 15, 2017 (5 pgs.).

T.J. Hastie et al. "Generalized additive models"—Chapter 7 Statistical Models in S eds, dated 1992 (15 pgs.).

\* cited by examiner

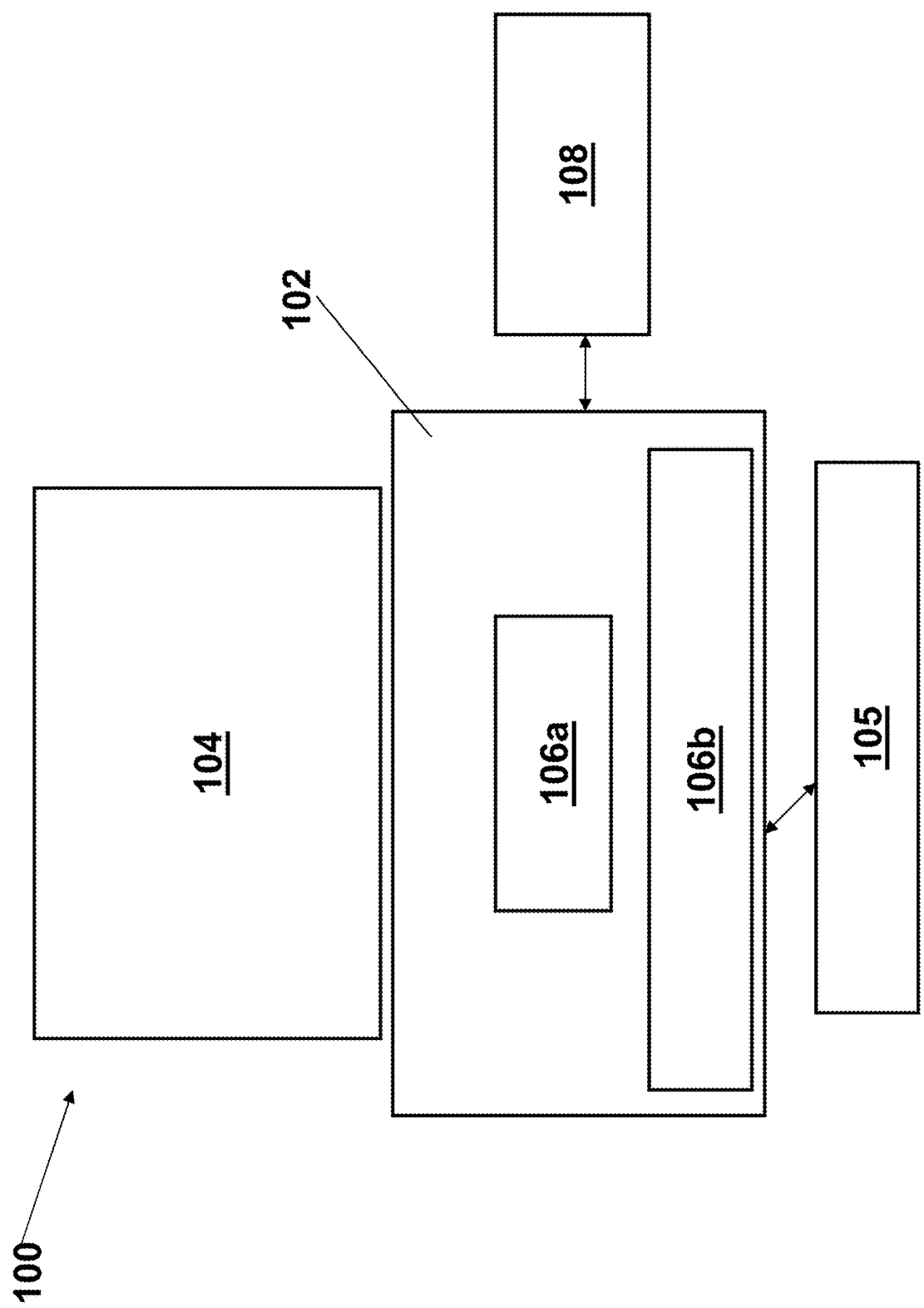

ENERGY DEPOSIT DISCOVERY SYSTEM AND METHOD

FIELD

The disclosure relates generally to a system and method for determining the location of an energy deposit and in particular to a system and method for determining one or more locations of the most productive drilling opportunities for oil and gas deposits.

BACKGROUND

Oil and natural gas producers, as well as others in the industry, have a critical need to know the locations of the most productive drilling opportunities. In fact, the location of a well is, in most cases, the most important single factor in the financial success of a well. Most of the efforts in petroleum geology and geophysics are aimed, ultimately, at this central question of what are the best locations to drill for oil and gas. The industry has developed many sophisticated systems and methodologies that attempt to answer this question, but do not provide a complete solution.

Most existing attempts to answer the question involve building a detailed geologic model of the subsurface strata using measurements collected from existing wells, seismic data, and knowledge about geologic processes that occur over millions of years. Sequence stratigraphy is an example of one strategy for building such a geologic model. These models help inform a company where to drill because they estimate certain variables that are typically important predictors of productive capacity of the well. Examples of such estimates variables are formation thickness, porosity, permeability and resistivity.

The existing strategies for building and interpreting geologic models are deficient when used to model areas larger than a few hundred square miles. Certain data, notably seismic data, may be unavailable or prohibitively expense to obtain for the larger areas. More importantly however, these models do not account for existing production in a consistent manner and fail to leverage statistical methods to estimate production based on the large number of data points available when a large area is being modeled. This results in models for existing strategies with lower predicting power. Thus, it is desirable to provide a system and method for predicting well locations that overcomes the above limitations of known systems and it is to this end that the disclosure is directed.

BRIEF DESCRIPTION OF THE DRAWINGS

FIG. 1 illustrates an example of a computer system that may implement an energy deposit discovery system;

DETAILED DESCRIPTION OF ONE OR MORE EMBODIMENTS

Figure 2A:
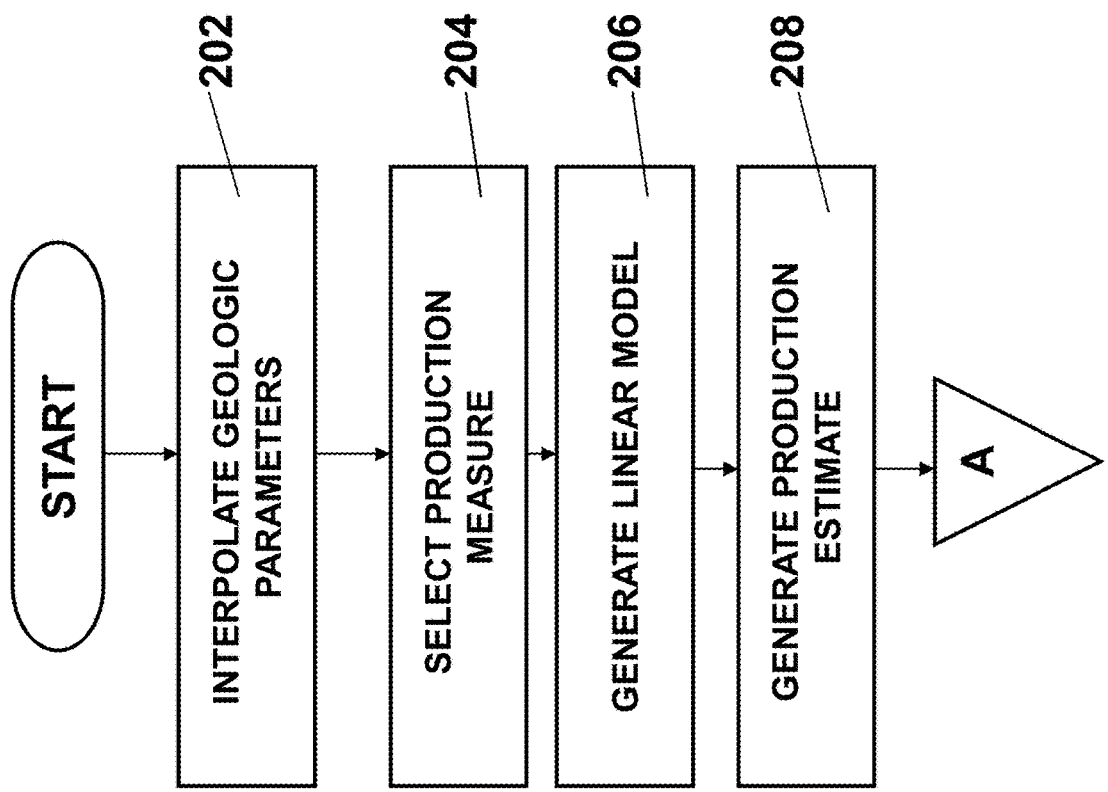
FIGS. 2A-2B illustrates a method for energy deposit discovery.

The disclosure is particularly applicable to a productive well determination system for oil and gas wells and it is in this context that the disclosure will be described. It will be appreciated, however, that the system and method has greater utility since it may be used to determine productive wells for other substances and it may be implemented in different manners known to people of skill in the art who would understand that those modifications/different implementation are within the scope of this disclosure. Furthermore, in addition to the production well measurement described below, the system and method may also be used to estimate any continuous variable at a location which is a function of geologic parameters that can be found (interpreted or estimated) at other locations in the neighborhood.

FIG. 1 illustrates an example of a computer system 100 that may implement an energy deposit discovery system. The computer system shown in FIG. 1 may be a stand-alone computer system that has a chassis 102 and a display device 104 and one or more input/output devices 105, such as a mouse, keyboard, printer and the like. The computer system may be a typical personal computer system or it may be a specialized computer system for the energy deposit discovery system. In one implementation of the energy deposit discovery system, the computer may store (and then execute using one or more processors of the computer system) an energy deposit discovery unit 106a (implemented as a plurality of lines of computer code) and a energy deposit discovery engine 106b (implemented as a plurality of lines of computer code) that together are the energy deposit discovery system. The energy deposit discovery engine 106b may further comprise an interpolation unit that performs the interpolation and selection processes described below, a modeling unit that performs the modeling processes described below and a display unit that handles the display processes described below, and each of these units may be hardware implemented or software implemented. In another implementation, the unit 106a and engine 106b may each be implemented in hardware (a hardware device that performs the function of the system described below). The computer system 100 shown in FIG. 1 also may have a store 108 that stores, among other things, the production well data and other data used by the energy deposit discovery system to perform its operations and functions described below. In a software implementation of the energy deposit discovery system, the plurality of lines of computer code may be lines of computer code written in the R programming language and running in the R environment on an Apple OSX or on a Microsoft Windows desktop computer. Alternatively, the software implementation of the energy deposit discovery system may be implemented using other programming languages, such as C++ or Java, and other operating systems, such as Linux, on various different hardware platforms.

In addition to the desktop implementation of the energy deposit discovery system, the energy deposit discovery system may also be implemented using other computer resources and other architectures, such as cloud computing resources, a mainframe, one or more server computers with client devices that interact with the server computer, a software as a service (SaaS) model and the like since the energy deposit discovery system is not limited to any particular computer system implementation.

The energy deposit discovery system determines a Production Measure, denoted as P, of a location of a possible drilling well. The Production Measure is any arbitrary function of a well's production characteristics. For example: P=O+G/20 where O is the initial rate of oil production and G is the initial rate of gas production. However, if one wants to only estimate oil, one can choose P=O. For the purpose of visualization and to simplify understanding of the output consisting of many locations for which P is estimated, the system and method may divide a large area using square cells of a predetermined size, such as 1 square mile each. In the system and method, P is estimated at the center of each square and all the determined values of P for all the cells are binned into a predetermined number of bins, such as 8 bins, and each bin is designated by a letter 'grade'. So with 8 bins example, the first bin may be designated 'A' and corresponds to the highest values of P. The next bin may be designated 'B' and so forth until the 'H' bin corresponding to the lowest range of P values. In one embodiment, a binning strategy of "equal width" is used but others can be used. This yields a map of squares with each square taking a letter 'grade' as described below in more detail. Finally, with a grid of graded cells, a user can grade any item that can be geographically located within the grid. For example, a permit (or intent) to drill a well has a location corresponding to the proposed well and so that permit or lease can be graded. Similarly, a mineral tract that is leased can similarly be graded based on the grid cells that intersect the mineral tract polygon. Now, a particular implementation of the method for energy deposit discovery is described in more detail with reference to FIGS. 2A-9.

Figure 2B:
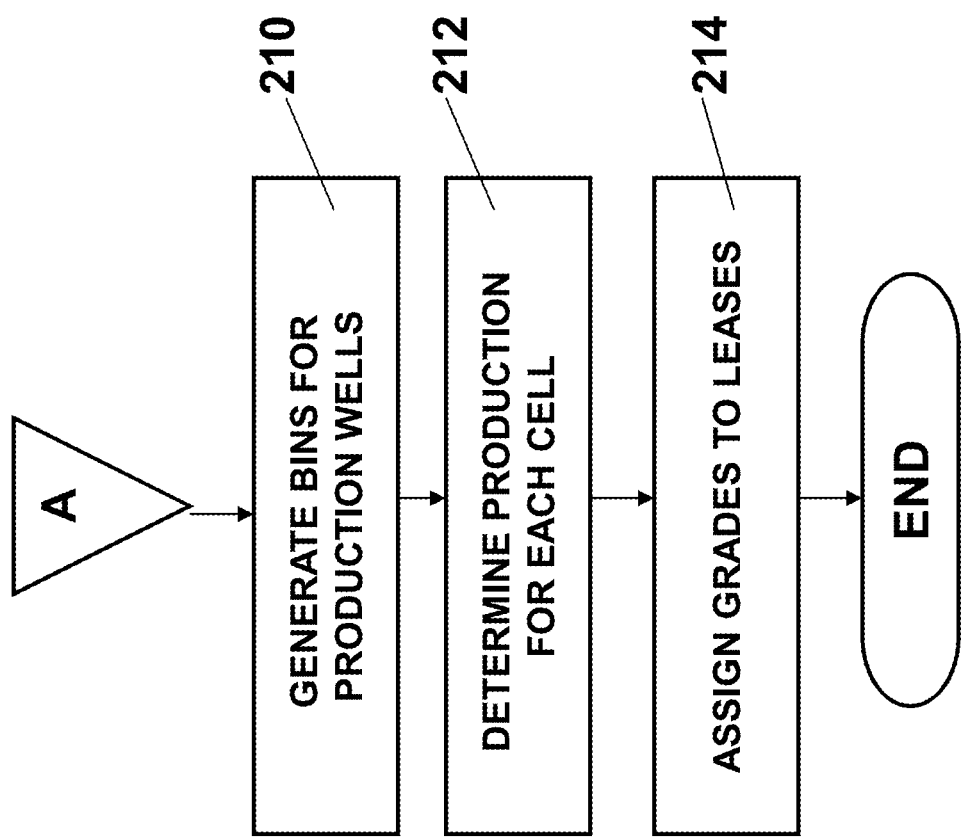

FIGS. 2A-2B illustrates a method 200 for energy deposit discovery. The method 200 may be implemented in the unit 106A and engine 106B shown in FIG. 1, but may also be implemented using a general purpose processor that executes the plurality of lines of computer code, a hardware device that has been programmed to implemented the processes below and the like. In the method in one embodiment, a user wants to identify the most productive well locations in a particular larger area which is difficult to do with current systems. The method may be used, for example, to identify productive wells in a very large area, such as tens to thousands of square miles.

For a given area (geological play) of interest, two separate sets of wells are chosen: Geologic wells and Production wells. Each set of wells contributes different information to create a model. The Geologic wells contribute information that is directly measured from the well. Such information is typically described as 'well log measurements' or simply 'well logs'. Geologic wells also contribute information that is interpreted from the well log information or, perhaps, other types of physical measurements of a well such as core samples or drill stem tests. Such information is known as interpreted geology and may include, for example, formation depth, formation thickness, rock properties, organic context, and many other variables. Geologic wells are chosen across the area of interest based on availability and quality of well log information available for each well. The combination of well log measurements and interpreted geology is a set of input into the model and are collectively called geologic parameters.

The Production wells contribute production volumes or other measurements that are used to compute the production measure, P. Production wells are chosen based on the set of all producing wells in the area of interest. The chosen wells must be producing from a depth of interest and must have enough months of production to establish the productive potential of the well (generally greater than 3 months of production). Additional constraints may be added such as the availability of wellbore path information.

In addition to the Geologic well information, the method and system may use other types of information to supplement the Geologic well information that models the geology. For example, seismic information and or core reports might be used as part of the data for the method.

Examples of geologic parameters used in one embodiment (for a particular area in Texas) are:

Formation depth for each formation: Austin Chalk, Upper Eagle Ford, Lower Eagle Ford, Buda, and Edwards. The formation surfaces are chosen using sequence stratigraphic techniques although other methodologies can be used Formation thickness for each formation: Austin Chalk, Upper Eagle Ford, Lower Eagle Ford, and Buda Gamma ray average and standard deviation across each formation: Upper Eagle Ford and Lower Eagle Ford.

Net feet having gamma ray greater than 75 (api units) for each formation: Upper Eagle Ford and Lower Eagle Ford.

Average and standard deviation resistivity measured by ILD measured across each formation: Upper Eagle Ford and Lower Eagle Ford.

Average and standard deviation neutron porosity (NPHI) measured across each formation: Upper Eagle Ford and Lower Eagle Ford.

Average and standard deviation bulk density (RHOB) measured across each formation: Upper Eagle Ford and Lower Eagle Ford.

Figure 3:
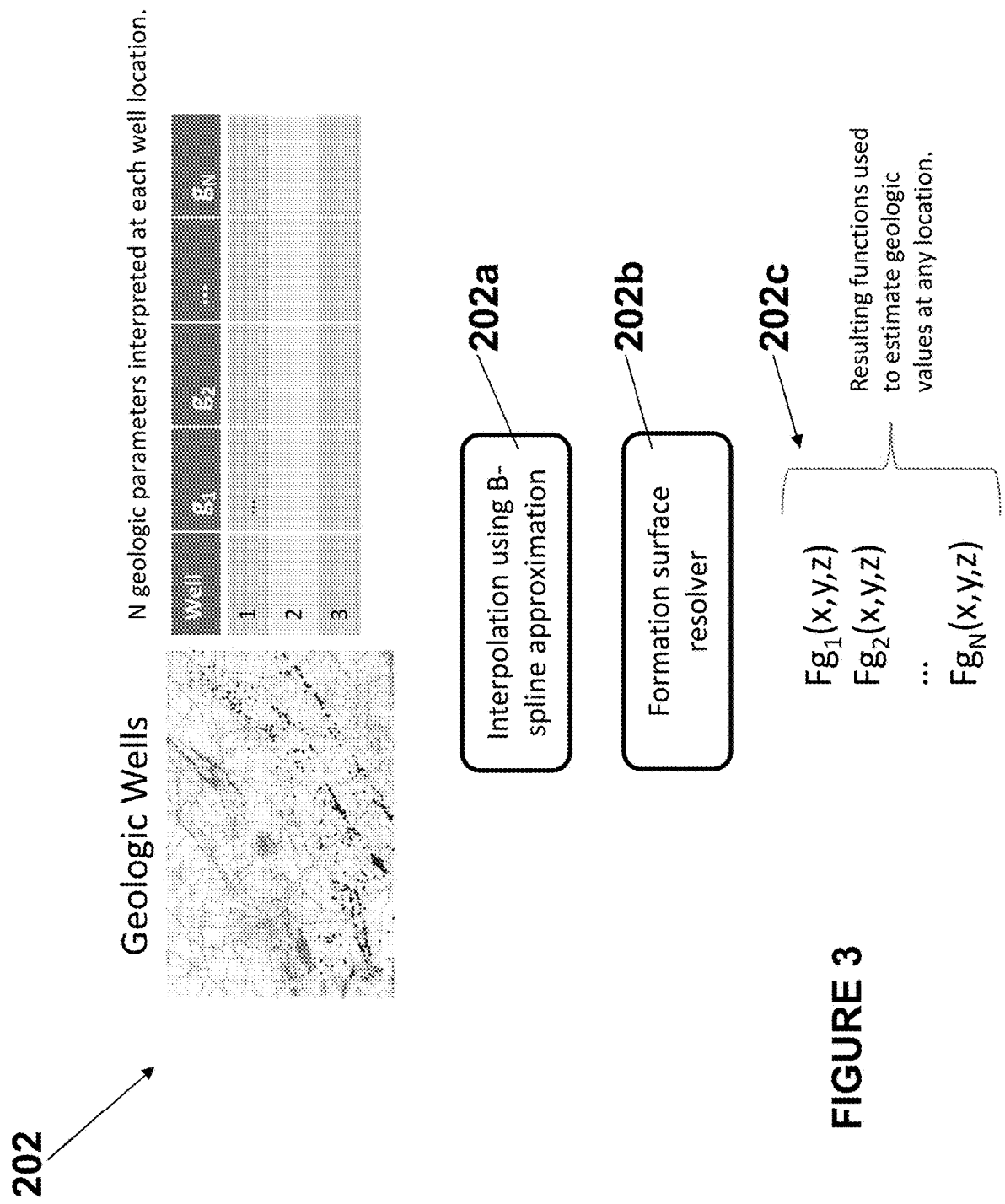
FIG. 3 illustrates an interpolation process of the energy deposit discovery method.
Figure 4:
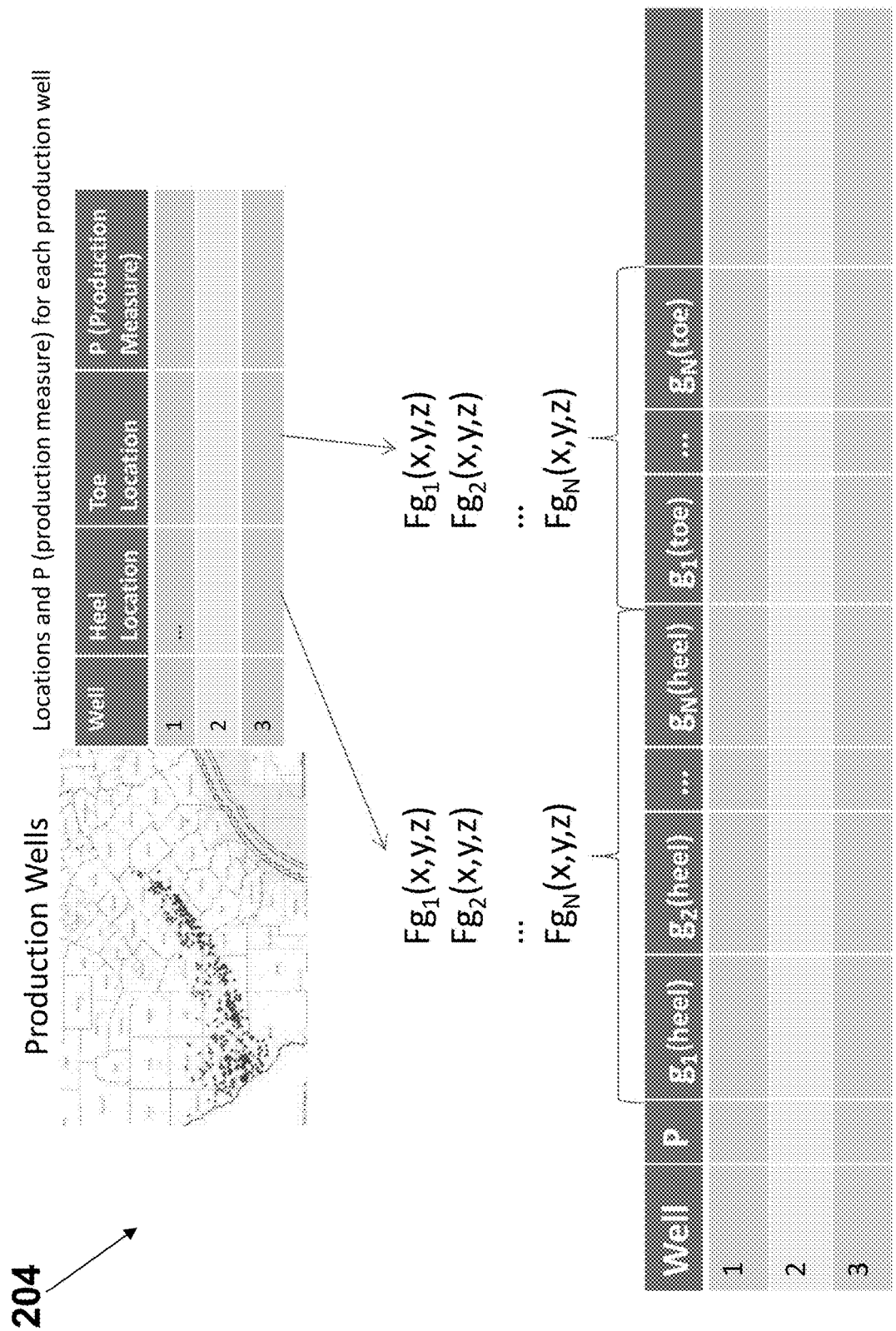
FIG. 4 illustrates a selection of production measure process of the energy deposit discovery method.

In the method, geologic parameters of an area are interpolated (202) and further details of the interpolation process are shown in FIG. 3. In particular, one to N geologic parameters ($g_1, \ldots, g_N$) are determined for each of a plurality of well locations (well 1, well 2, ..., well 3 as shown in the example in FIG. 3) in the area that is of interest to the user. A non-exhaustive list of the geologic parameters are set forth above. In this process, the method may use interpolation using B-spline approximations 202a and a formation surface resolver 202b to generate a set of functions $Fg_1(x,y,z), Fg_2(x,y,z), \ldots, Fg_N(x,y,z)$ to estimate the geologic values at any geographic location.

The formation surface resolver process 202b operates on a subset of the geologic parameters and thus affects that subset of functions. The subset is comprised of those geologic parameters that indicate the depth of a geologic surface. The geologic surfaces have some physical constraints. In particular, one geologic surface never crosses another geologic surface although two surfaces may touch. For example, imagine there are 4 surfaces: A, B, C, and D and that physically, A is above B which is above C which is above D. It is possible that at some locations, A could touch B or B could touch C or C could touch D. However, C will never cross over B and touch A. If C touches A, then B must touch A. The formation surface resolver is a method and system to ensure that those physical constraints are honored. The process used to ensure the physical constraints are honored is to use interpolation to find the depth of the top most formation surface (surface A using the above example) at every location using, as inputs to the approximation, the depth of the top most surface at the locations of each geologic well. The interpolation used may be b-spline approximation (202a). Next, use interpolation to find the formation thickness between the upper most formation and the next deeper formation (between A and B using the example above) using as inputs to the approximation, the formation thickness at the locations of each geologic well. This is the interpolated thickness of the top most formation at every point. If $D_A(x,y)$ denotes the function that describes the interpolated depth (always as a negative number) of the top most formation (surface A), and if $T_A(x,y)$ denotes the function that describes the interpolated thickness of the top most formation, then the depth of the next deepest formation (surface B) is given by $D_B(x,y)=D_A(x,y)-T_A(x,y)$. Next, use interpolation to find the formation thickness between surface B and surface C using as inputs to the approximation, the formation thickness at the locations if each geologic well. If this interpolated thickness is represented by the function $T_B(x,y)$, then the depth of the next deeper surface is given by $D_C(x,y)=D_A(x,y)-T_A(x,y)-T_B(x,y)$. This process continues until all the surface depth functions are generated. Because each thickness function ($T_A(x,y)$, $T_B(x,y)$, . . . ) is everywhere greater than or equal to zero, the process guarantees that the physical constraints are honored. Using these geologic values, the method then selects a production measure (204) that is shown in more detail in FIG. 4. In this process, a production measure (P) is chosen for the production wells. The production measure might be, for example, $O_{max}+(1/20)*G_{max}$ where $O_{max}$ and $G_{max}$ are, respectively, the maximum monthly oil and gas production seen in any month for a well since the well began producing. This is a known in the energy industry as a "barrel of oil equivalent" using a 20:1 ratio of gas to oil. Another production measure might be just $O_{max}$ or just $G_{max}$. Yet another might be $O_c+(1/20)*G_c$ where $O_c$ and $G_c$ are, respectively, the cumulative oil and cumulative gas produced to date for the well. Yet another might be the square root of $O_{max}+(1/20)*G_{max}$ or the natural logarithm of $O_{max}+(1/20)*G_{max}$ In the above measures, $O_{max}$ may be as high as 45000 BO/mo (Barrels of Oil per month) and $G_{max}$ may be as high as 300000 MCF/mo (1000's of cubic feet per month) in a certain onshore area or perhaps higher.

For each well, the store 108 has various characteristics of each well including a heel location and a toe location of each well and a production measure. The heel and toe locations of a well are industry terms for two particular sections of a horizontally drilled well. In a horizontally drilled well, the operator first drills the vertical portion of the well to reach a certain depth. Then, the direction of the drill bit is slowly turned to the horizontal (which is approximately parallel to the surface of the earth). This slow turn to the horizontal may happen over 1000 feet or more. Once the drill bit is approximately horizontal, then drilling proceeds horizontally. The point along the wellbore path where the drill bit becomes close to horizontal is called the heel. The endpoint of the wellbore path is called the toe. Using the location parameters for each well determined above, the method then estimates the geologic parameters using the functions, $Fg_1(x,y,z)$, $Fg_2(x,y,z)$, . . . , $Fg_N(x,y,z)$, described above. The result of this process is N geologic parameters for each well heel location and N geologic parameters for each well toe location as shown in the bottom part of FIG. 4. This method could further be extended to give the value of each of N geologic parameters at any one or more locations along the wellbore path in addition to the heel and toe locations.

Figure 5:
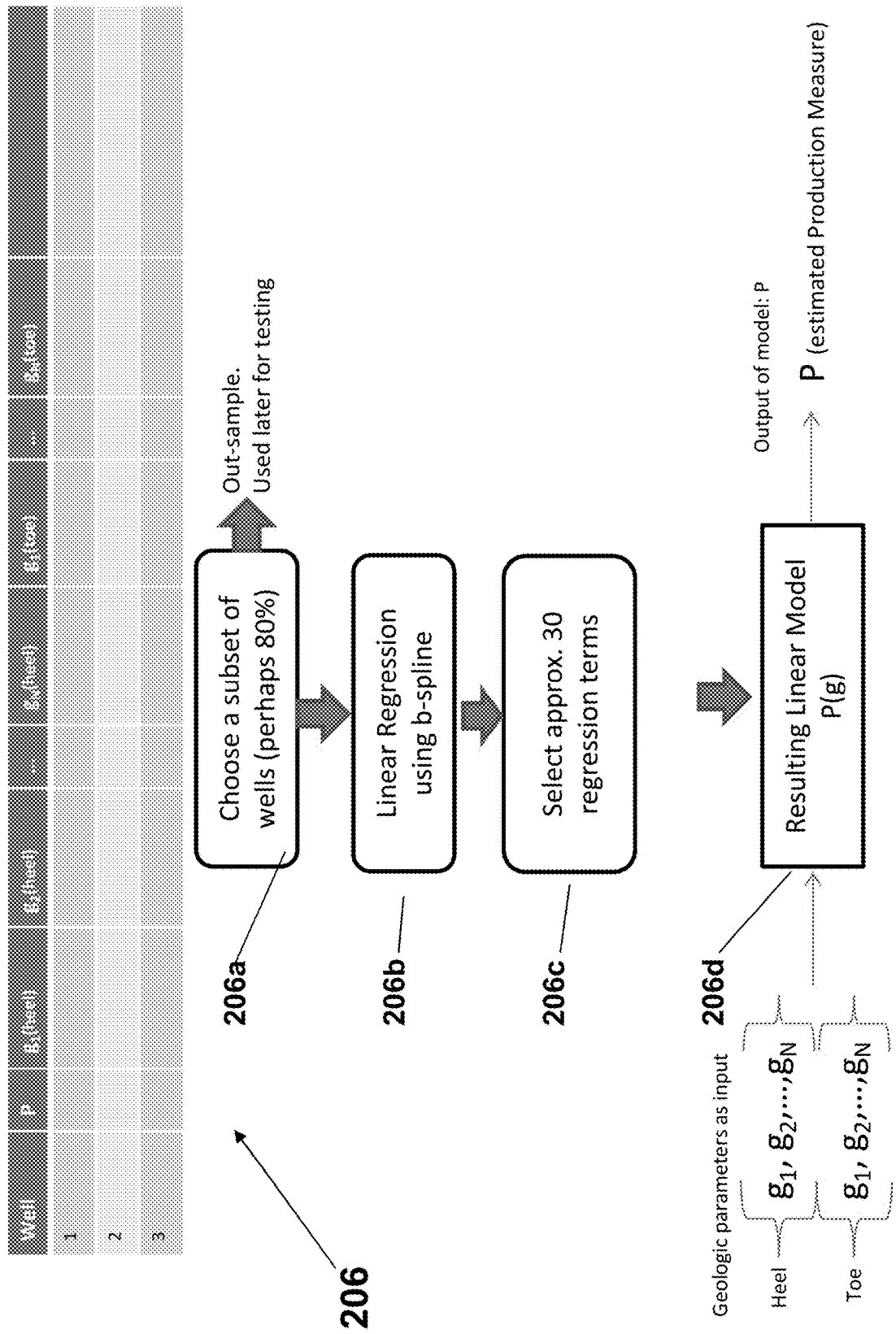
FIG. 5 illustrates a generation of linear model process of the energy deposit discovery method.

Using the geologic parameters given by the functions $Fg_1(x,y,z)$, $Fg_2(x,y,z)$, . . . , $Fg_N(x,y,z)$ at each production well heel and toe location, the method then generates a linear model (206) and the details of which are shown in FIG. 5. In more detail, this process builds a linear model (206b) that relates the Production Measure, P, of each production well to the set of 2*N estimated geologic parameters (N parameters for each heel and toe location). This linear model could be extended to relate P to estimated geologic parameters at more than just the heel and toe locations of each production well. In practice, only a subset of the production wells, perhaps 80%, are used to build the model (206a.) The remaining "out-sample" wells are used later to check the result. In the process, a linear model is created using a set of b-spline basis functions. This process is documented in Hastie, T. J. (1992) Generalized additive models. Chapter 7 of *Statistical Models in S* eds J. M. Chambers and T. J. Hastie, Wadsworth & Brooks/Cole which is incorporated herein by reference.

In more detail, the linear regression model can have as many as K=N×M regression terms where N is the number of geologic parameters (approx. 30 parameters in this embodiment) and M is the order of the polynomial fit ($5^{th}$ order in this embodiment). Therefore, there are K possible regression terms. In order to limit over fitting, it is desirable to have fewer regression terms. In one embodiment, the method (206c) uses the 30 most important regression terms using an algorithmic strategy that is discussed in Das et al., "Algorithms for Subset Selection in Linear Regression", 40th ACM International Symposium on Theory of Computing (STOC '08), May 17-20, 2008, pp. 45-54 which is incorporated herein by reference. The strategy proceeds as follows: find the one regression term from the K available terms, a1, which alone creates the highest r-squared in a linear model. Next, find the regression term, a2, from the K−1 remaining available terms, which when combined with a1 to create a 2 term model, has the highest r-squared. Next, find the regression term a3 from the K−2 remaining available terms, which when combined with a1 and a2 to create a 3 term model, has the highest r-squared. This process continues until all 30 terms are chosen. Finally, the least important terms are removed by comparing models using ANOVA.

After keeping the 30 most important regression terms, or perhaps fewer based on the ANOVA analysis, the resulting linear model (206d) can predict the Production Measure, P, as a function of the geologic parameters $g_{1,heel}$, $g_{2,heel}$, $g_{n,heel}$, $g_{1,toe}$, $g_{2,toe}$, $g_{n,toe}$. The method to build the linear model (206) could instead use other strategies. Furthermore, the method could use nonlinear modeling strategies, like classification and regression trees (CART), to model the production measure from the geologic parameters (206d).

Figure 6:
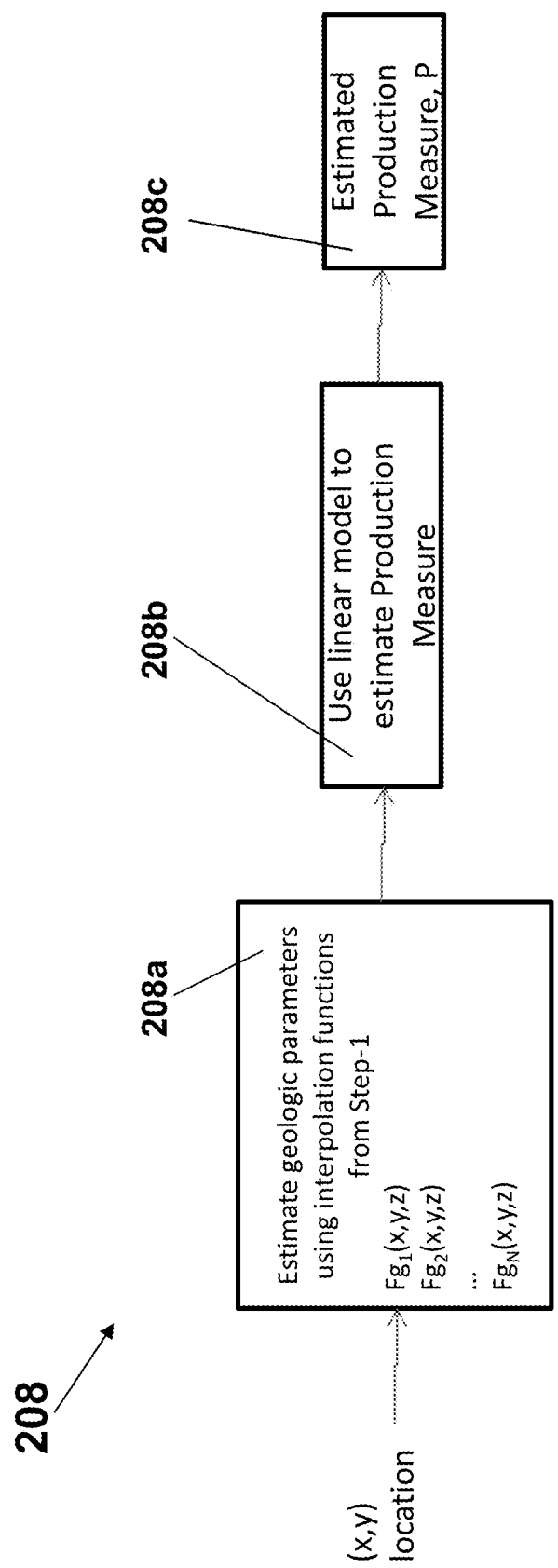
FIG. 6 illustrates a generation of estimated production measure process of the energy deposit discovery method.

Once the production measure has been estimated, the method generates a production estimate for each well or locations (208) and further details of this process is shown in FIG. 6. In the process, an (x,y) location is input into the process (which is the location of a well, for example) and the process estimates geologic parameters using the interpolation functions generated above ($Fg_1(x,y,z)$, $Fg_2(x,y,z)$, . . . , $Fg_N(x,y,z)$ and then the process uses a linear model to estimate the production measure for the location (208b.) The process then generates the estimated production measure, P, for the location (208c.) The system can also estimate the production measure for a polygon area instead of a point. The method to estimate the production for a polygon proceeds by estimating some number of points within the polygon. The points may be selected randomly or on a regular grid and the number of points to be estimated is in the range of ten to one hundred per square mile. The estimated production for all the points are averaged to estimate the production of a single well in the polygon. These polygons may represent acreage tracts that are owned by mineral owners or may represent prospective drilling locations.

Figure 7:
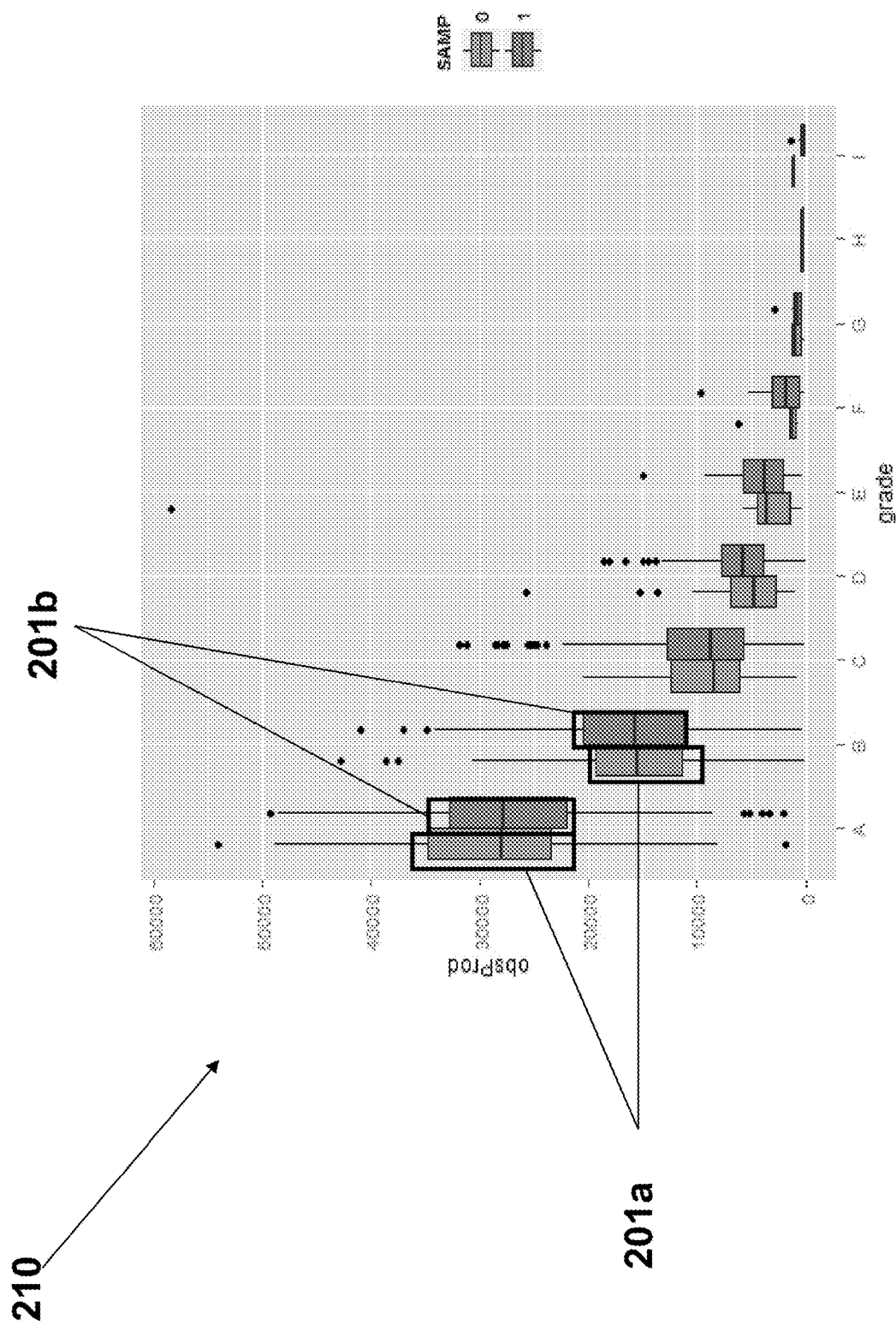
FIG. 7 illustrates a generation of production well bins process of the energy deposit discovery method.

Once the production measure is generated for each location, the method may generate bins for the production wells (210) and more details of this process are shown in FIG. 7. FIG. 7 is a box/whisker plot of the estimated Production Measure plotted against the Grade for each production well. A set of red bars 201a are wells that were used in the generation of the linear model. A set of blue bars 201b were wells that were excluded from the model generated and are used to verify that wells that the model has never seen can be graded accurately to predict production. Alternatively, this demonstrates shows that the model does not over-fit the data.

Figure 8:
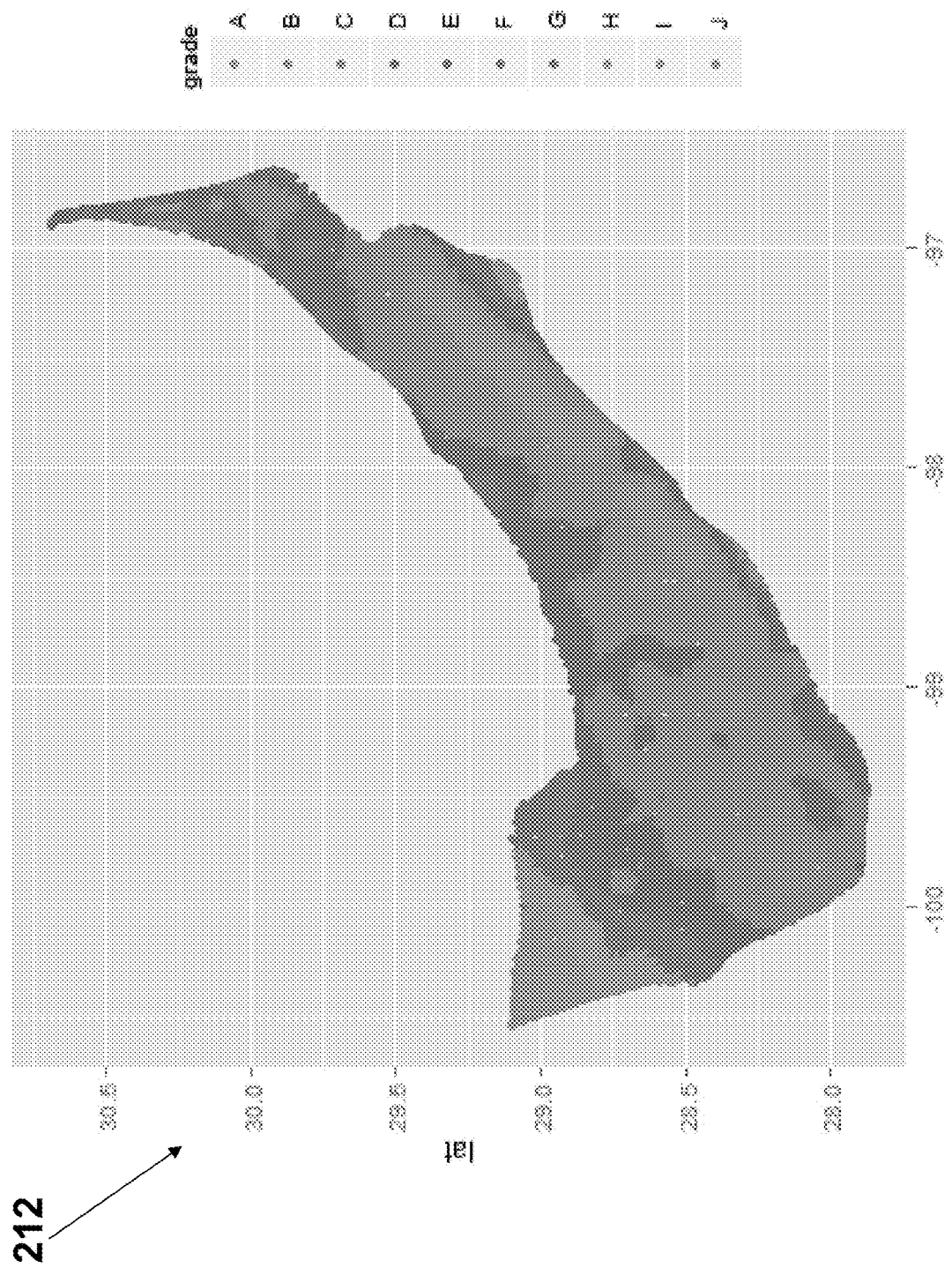
FIG. 8 illustrates a process for determining production for each well that is part of the energy deposit discovery method.

Now, the method determines a production for each cell (212) that is shown in greater detail in FIG. 8. In the method, a map may be generated that has the "grade". In particular, FIG. 8 shows a map of 1 square mile grid cells (based on a latitude and a longitude), each assigned a letter grade based on the predicted production for the location at the center of the grid cell.

Figure 9:
FIG. 9 illustrates an assignment of scores to leases process of the energy deposit discovery method.

Now, the method assigns grades to leases (214) and the results of the process are shown in greater detail in FIG. 9. The resulting color map allows a user to see the well that are most likely to be productive based on the geologic features and the analysis, such as the grade A locations 214a or the grade B locations 214b that are shown on the map. Using this colored map, a user is able to see a large area and the estimated grades for each location in the map that allows the user to select the leases to bid on for new production wells.

Since the system can also estimate the production measure for a polygon, the system can also bin the production polygons. It can then assign "grades" to the bins of polygons and thus assign a grade to each polygon.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. An apparatus for identifying one or more new locations for a well in an area having a plurality of existing wells, wherein each existing well has a set of geologic parameters associated with the well, the apparatus comprising:
   a computer system having a processor and a display;
   the processor configured to receive data about existing wells including one or more existing geologic wells and one or more existing production wells wherein each existing geologic well has one or more geologic parameters and each existing production well has a production measure, to interpolate the one or more geologic parameters of one or more of the existing geologic wells, wherein the one or more geologic parameters include one or more geologic parameters for each toe of each existing geologic well and one or more geologic parameters for each heel of each existing geologic well that are used to generate estimated geologic parameters for a new location in the area having a plurality of existing wells and selects a production measure for each of the one or more of the existing production wells, wherein the production measure is a combination of oil production and gas production for each existing production well;
   the processor configured to generate a statistical model based on the production measures of the one or more of the existing wells, generate an estimated production for the new location in the area having the estimated geologic parameters based on the one or more estimated geologic parameters and generate a grade for each new location in the area based on the estimated production; and
   the display displaying the grades for each new location in the area for the well.

2. The apparatus of claim 1 further comprising an energy deposit display unit, hosted on the computer system, that assigns a grade to each of the plurality of locations in the area and generates a user interface showing each of the plurality of locations in the area with the different grades.

3. The apparatus of claim 1, wherein the processor is configured to generate a linear model using a linear regression with a b-spline.

4. The apparatus of claim 1, wherein the processor is configured to generate a nonlinear model.

5. The apparatus of claim 1, wherein the processor is configured to generate a linear model that uses as inputs geologic parameters that are estimated at the heel and toe and zero or more locations along the wellbore path.

6. The apparatus of claim 3, wherein the processor is configured to choose a subset of existing wells to generate the linear model and select a predetermined number of regression terms for use in the linear regression.

7. The apparatus of claim 6, wherein the predetermined number is thirty.

8. The apparatus of claim 1, wherein the computer system is one of a personal computer, a desktop computer and a cloud computing resource.

9. The apparatus of claim 1, wherein the energy deposit is one of oil, oil and gas, gas and minerals.

10. The apparatus of claim 1, wherein the statistical model is a linear model.

11. A method for identifying one or more locations for a well in an area having a plurality of existing wells, wherein each well has a set of geologic parameters associated with the well, the method comprising:
   receiving data about existing wells including one or more existing geologic wells and one or more existing production wells wherein each existing geologic well has one or more geologic parameters and each existing production well has a production measure;
   interpolating, by a processor of a computer system, the one or more geologic parameters of one or more of the existing geologic wells, wherein the one or more geologic parameters include one or more geologic parameters for each toe of each existing geologic well and one or more geologic parameters for each heel of each existing geologic well that are used to generate estimated geologic parameters for a location in the area having a plurality of existing geologic wells;
   selecting a production measure for each of the one or more of the existing production wells, wherein the production measure is a combination of oil production and gas production for each existing production well;
   generating, by the processor of the computer system, a statistical model based on the production measures of the one or more of the existing wells at any of the locations for the well in the area;
   generating an estimated production for the location in the area having the estimated geologic parameters based on the one or more estimated geologic parameters;
   generating a grade for each new location in the area based on the estimated production; and
   displaying the grades for each new location in the area for the well.

12. The method of claim 11 further comprising assigning a grade to each of the plurality of locations in the area and generating a user interface showing each of the plurality of locations in the area with the different grades.

13. The method of claim 11, wherein generating the linear model further comprises using linear regression with a polynomial.

14. The method of claim 11, wherein interpolating the one or more geologic parameters further comprises interpolating the one or more geologic parameters using a B-spline approximation.

15. The method of claim 11, wherein generating the statistical model further comprises generating a nonlinear model.

16. The method of claim 11, wherein generating the statistical model further comprises generating a linear model that uses as inputs geologic parameters that are estimated at the heel and toe and zero or more locations along the wellbore path.

17. The method of claim 13, wherein generating the linear model further comprises choosing a subset of existing wells to generate the linear model and selecting a predetermined number of regression terms for use in the linear regression.

18. The method of claim 17, wherein the predetermined number is thirty.

19. The method of claim 11, wherein the energy deposit is one of oil, oil and gas, gas and minerals.

20. The method of claim 11, wherein the statistical model in a linear model.

21. The apparatus of claim 1, wherein the production measure is one of a combination of a maximum monthly oil production and a maximum monthly gas production for each existing well, a maximum monthly oil production for each existing well, a maximum monthly gas production for each existing well and a combination of a cumulative oil and gas produced to date for each existing well.

22. The method of claim 11, wherein the production measure is one of a combination of a maximum monthly oil production and a maximum monthly gas production for each existing well, a maximum monthly oil production for each existing well, a maximum monthly gas production for each existing well and a combination of a cumulative oil and gas produced to date for each existing well.

23. The apparatus of claim 1, wherein the processor configured to interpolate one or more geologic parameters generates a formation thickness.

24. The method of claim 11, wherein interpolating the one or more geologic parameters further comprises generating a formation thickness based on the one or more geologic parameters.

\* \* \* \* \*